(12) United States Patent  
Ropert (10) Patent No.: US 12,501,043 B2
(45) Date of Patent: Dec. 16, 2025

(54) SYSTEMS AND METHODS FOR SCALABLE HYBRID VIDEO ENCODING

(71) Applicant: MK Systems USA Inc., Wilmington, DE (US)

(72) Inventor: Michael Ropert, Rennes (FR)

(73) Assignee: MK Systems USA Inc., Wilmington, DE (US)

( * ) Notice: Subject to any disclaimer, the term of this patent is extended or adjusted under 35 U.S.C. 154(b) by 0 days.

(21) Appl. No.: 18/747,013

(22) Filed: Jun. 18, 2024

(65) Prior Publication Data

US 2024/0430427 A1    Dec. 26, 2024

(30) Foreign Application Priority Data

Jun. 21, 2023 (EP) .................................. 23305980

(51) Int. Cl.
| | |
|---|---|
| *H04N 19/124* | (2014.01) |
| *H04N 19/176* | (2014.01) |
| *H04N 19/18* | (2014.01) |
| *H04N 19/625* | (2014.01) |
| *H04N 19/91* | (2014.01) |

(52) U.S. Cl.
CPC ......... *H04N 19/124* (2014.11); *H04N 19/176* (2014.11); *H04N 19/18* (2014.11); *H04N 19/625* (2014.11); *H04N 19/91* (2014.11)

(58) Field of Classification Search
CPC ........................... H04N 19/124; H04N 19/176
USPC .................................................. 375/240.03
See application file for complete search history.

(56) References Cited

U.S. PATENT DOCUMENTS

| | | | |
|---|---|---|---|
| 10,567,825 B2 | 2/2020 | Jones et al. | |
| 11,778,012 B2 | 10/2023 | Jones et al. | |
| 2005/0271140 A1* | 12/2005 | Hanamura | H04N 19/36 375/E7.176 |
| 2006/0171463 A1 | 8/2006 | Hanamura et al. | |
| 2008/0069240 A1* | 3/2008 | Amon | H04N 19/15 375/E7.146 |

FOREIGN PATENT DOCUMENTS

| | | |
|---|---|---|
| EP | 1217841 A2 | 6/2002 |
| EP | 2068567 A2 | 6/2009 |
| WO | WO-03026310 A2 | 3/2003 |

OTHER PUBLICATIONS

European Patent Office, Communication, Extended European Search Report issued for European Patent Application No. 23305980.7, dated Jan. 15, 2023, 9 pages.

(Continued)

*Primary Examiner* — Amir Shahnami
(74) *Attorney, Agent, or Firm* — Norton Rose Fulbright US LLP (57) ABSTRACT

Systems, devices and methods for encoding video data are provided. Video data is encoded to generate an encoded data structure that includes, for a given pixel block: a plurality of data layers, each associated with one of a plurality of quality levels and each including data defining: a plurality of transform coefficients encoded for the associated quality level; and a quantization step size for the given pixel block and the associated quality level. At least one of the data layers includes a header including data defining a plurality of encoder decisions made for the given pixel block, the encoder decisions common across the quality levels.

15 Claims, 9 Drawing Sheets

(56) References Cited

OTHER PUBLICATIONS

Amon, P. et al. "SNR Scalable Layered Video Coding," Proceedings of the 12th International Packet Video Workshop, Pittsburgh, PA, USA, Apr. 2002, 8 pages.

Amon, P. et al. "Efficient Coding of Synchronized H.26L Streams," VCEG Meeting, Video Coding Experts Group of ITU-T SG.16, VCEG-N35, Sep. 2001, 8 pages.

Ropert, M. et al. "Mastering Quantization is Key for Video Compression," in SMPTE Motion Imaging Journal, vol. 131, No. 5, pp. 45-53, Jun. 2022, 12 pages.

Van Wallendael, G. et al. "Fast Transcoding for Video Delivery by Means of a Control Stream," 2012 19th IEEE International Conference on Image Processing (ICIP), Sep. 2012, pp. 733-736, 4 pages.

Hollmann, C. et al. "Guided Transcoding Using Deflation and Inflation." Proceedings of the 23rd Packet Video Workshop, MMSys '18: 9th ACM Multimedia Systems Conference. New York, NY, USA: ACM, 2018, 6 pages.

Boyce, J. M. et al. "Overview of SHVC: Scalable Extensions of the High Efficiency Video Coding Standard," IEEE Transactions on Circuits and Systems for Video Technology, vol. 26, No. 1, pp. 20-34, Jan. 2016, 15 pages.

\* cited by examiner

SYSTEMS AND METHODS FOR SCALABLE HYBRID VIDEO ENCODING

CROSS-RELATED APPLICATIONS

This application claims priority to European Patent Application No. 23305980.7, filed Jun. 21, 2023, the contents for which is incorporated by reference in its entirety.

FIELD

This disclosure relates to video encoding, and more particularly relates to scalable hybrid video encoding.

BACKGROUND

Streaming of video content to end users over the Internet, such as via over-the-top media services, typically requires encoding such video content to be suitable for streaming. Encoding is resource intensive. For example, the computations required for encoding may require significant computation resources (e.g., CPU or GPU resources). For example, storing encoded data may require significant data storage resources. Therefore, improvements in resource usage are desired.

SUMMARY

In accordance with an aspect, there is provided an encoding system. The system includes a plurality of encoders for encoding a given block of video data at a plurality of quality levels, each of the encoders generating a bitstream associated with a corresponding one of the quality levels, the data bitstream including: a plurality of transform coefficients encoded for the associated quality level; and a quantization step size for the given block of video data and the associated quality level; wherein at least one of the data bitstreams includes a header including data defining a plurality of encoding decisions made for the given pixel block, the encoding decisions common across the quality levels. The system also includes an aggregator for aggregating the bitstreams generated by the plurality of encoders into an aggregated data structure.

In accordance with another aspect, there is provided a computer-implemented method of encoding video data. The method includes encoding video data to generate an encoded data structure that includes, for a given pixel block: a plurality of data layers, each associated with one of a plurality of quality levels and each including data defining: a plurality of transform coefficients encoded for the associated quality level; and a quantization step size for the given pixel block and the associated quality level; wherein at least one of the data layers includes a header including data defining a plurality of encoder decisions made for the given pixel block, the encoder decisions common across the quality levels.

Many further features and combinations thereof concerning embodiments described herein will appear to those skilled in the art following a reading of the instant disclosure.

BRIEF DESCRIPTION OF THE DRAWINGS

In the figures.

In the drawings, like numerals having different suffixes represent different instances of similar components.

These drawings depict exemplary embodiments for illustrative purposes, and variations, alternative configurations, alternative components and modifications may be made to these exemplary embodiments.

DETAILED DESCRIPTION

Figure 1:
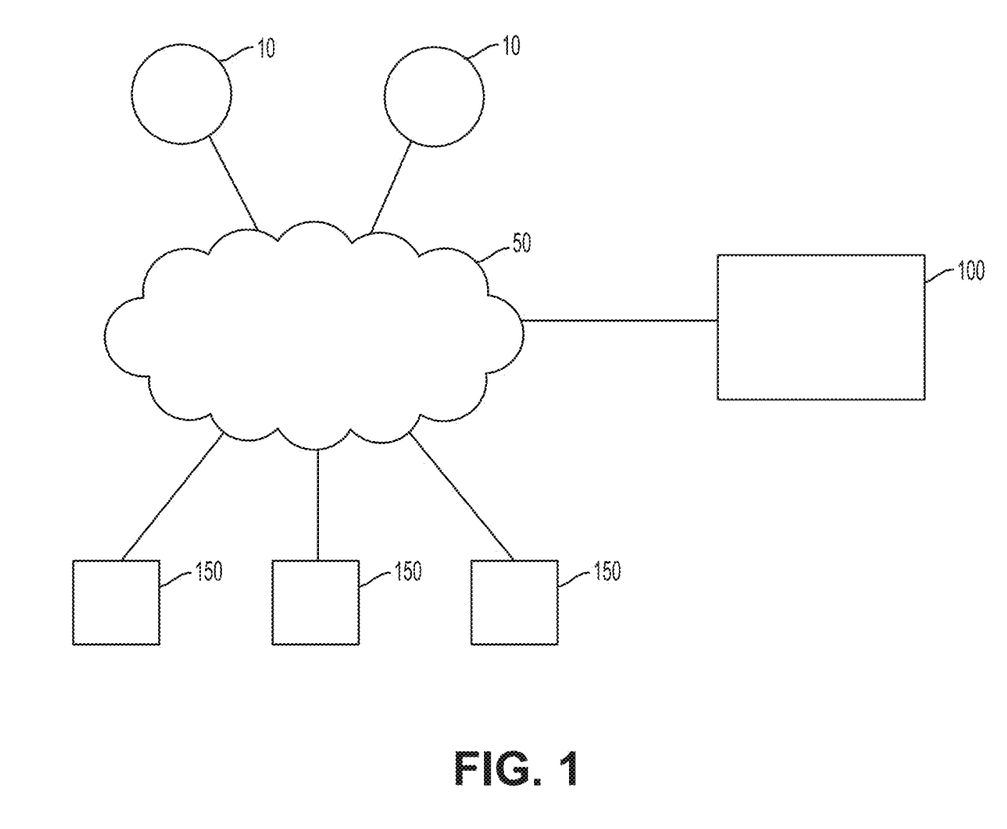
FIG. 1 is a network diagram of an example over-the-top (OTT) media service including a content processing system, in accordance with an embodiment.

FIG. 1 is a diagram depicting a network environment of an example over-the-top (OTT) media service for delivering video content to end users, in accordance with an embodiment. The OTT media service includes a content processing system 100 that processes video content in manners disclosed herein to facilitate streaming to end users. In various embodiments, content processing system 100 may process video content to be livestreamed to end users and/or to be stored for later streaming, e.g., on-demand.

As depicted, content processing system 100 is interconnected with a plurality of content sources 10 and a plurality of client devices 150, by way of a communication network 50. Content processing system 100 receives source content spanning a plurality of video channels from one or more of content sources 10 and processes such content to facilitate streaming to end users at client devices 150. Such processing includes, for example, encoding the content to be suitable for streaming to end users.

In the depicted embodiment, each content source 10 may be a conventional source of video content (including audio-video content) such as, for example, a television station or an Internet live stream. For example, a content source 10 may receive linear content by way of a satellite signal, a radio frequency (RF) antenna signal, or a dedicated portion of network 50. Content may be received by content processing system 100 in various formats and bitrates, where it is processed for streaming to client devices 150.

Each client device 150 is a device operable by an end user to play streamed video content. For example, a client device 150 may be a digital media player, a set-top box, a video game console, each connected to a display device for playing streamed content. A client device 150 may also be smart TV device or a personal computing device such as a laptop computer, a tablet computer or a smartphone, each having an integrated display screen.

Network 50 may include a packet-switched network portion, a circuit-switched network portion, or a combination thereof. Network 50 may include wired links, wireless links such as radio-frequency links or satellite links, or a combination thereof. Network 50 may include wired access points and wireless access points. Portions of network 50 could be, for example, an IPv4, IPv6, X.25, IPX or similar network. Portions of network 50 could be, for example, a GSM, GPRS, 3G, LTE, 5G, or similar wireless networks. Network 50 may include or be connected to the Internet. When network 50 is a public network such as the public Internet, it may be secured as a virtual private network.

In the depicted embodiment, portions of network 50 interconnecting content processing system 100 with client devices 150 are adapted for transmission of video streams (including audio-video streams) over HTTP. In other embodiments, other protocols may be used for transmission of video streams.

As detailed herein, content processing system 100 includes a scalable encoder 400 (FIG. 4) configured to encode video content to provide multiple bitstreams at corresponding multiple quality levels, each in accordance with a corresponding encoding profile.

Embodiments of content processing system 100 may produce various technical effects and provide various technical advantages. For example, in some embodiments, content processing system 100 provides flexibility that enables an end user to stream video content encoded at a particular quality level suitable for the end user's available or desired bandwidth for streaming. This quality level may be selected automatically based on the available bandwidth, as indicated by the end user or as measured automatically during streaming.

In some embodiments, the flexibility noted above does not require decoding and re-encoding at the time of streaming (e.g., decoding content encoded at a higher quality level and re-encoding at a particular desired lower quality level), as may be required in conventional full-transcoding approaches. Thus, in such embodiments, some of the high computational cost of full-transcoding approaches are avoided.

In some embodiments, the flexibility noted above does not require storing encoded data for each of the plurality of quality levels separately, as may be required in a conventional simulcast approach. Thus, in such embodiments, some of the high data storage costs of simulcast approaches are avoided.

In some embodiments, the flexibility noted above is compatible with conventional decoding equipment, such that no changes are required to an end user's device.

Figure 2:
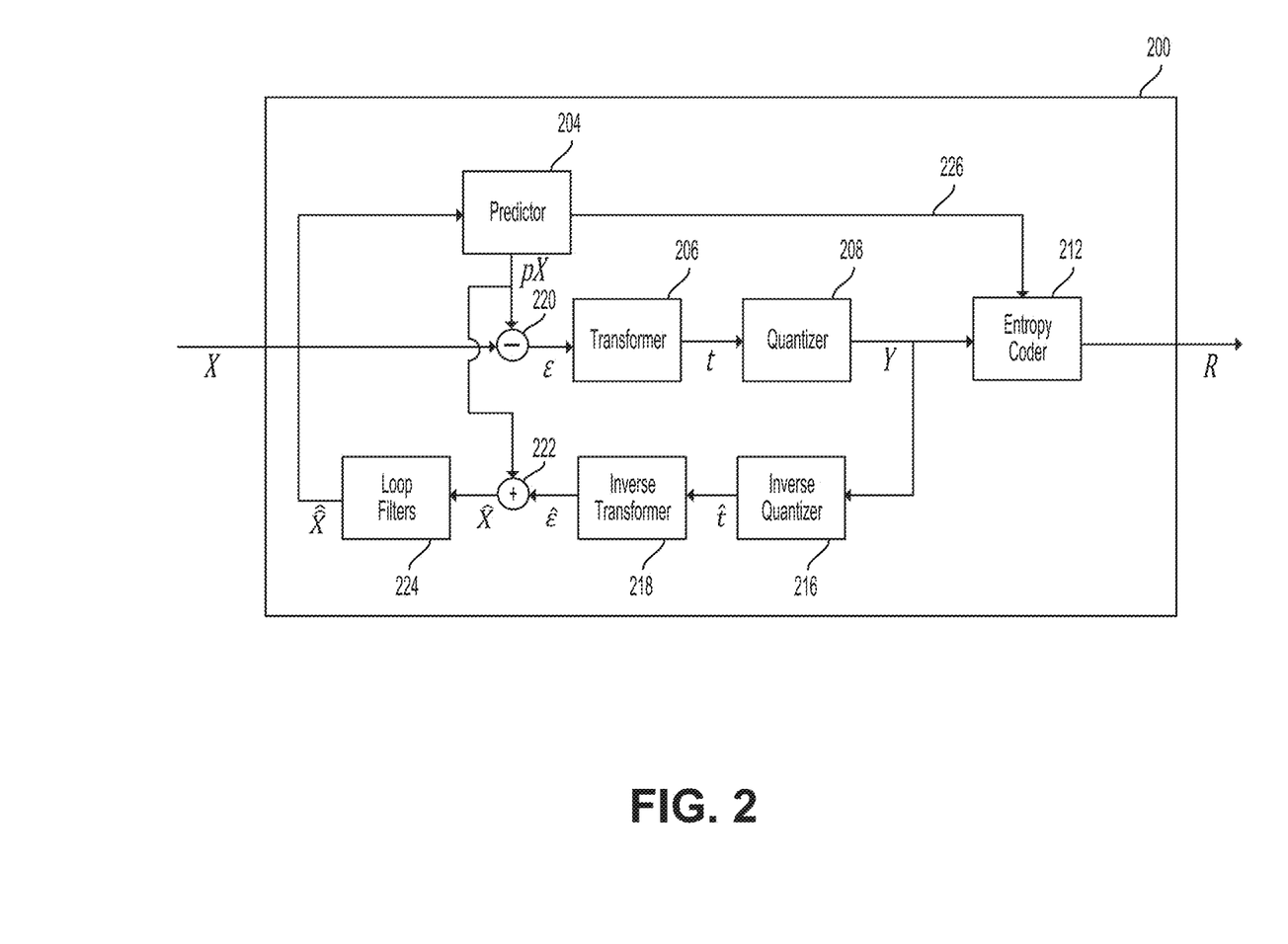
FIG. 2 is a schematic diagram of a hybrid encoder.

FIG. 2 depicts a conventional hybrid encoder 200, as may be adapted and improved upon to provide encoder 400 (FIG. 4), in accordance with embodiments disclosed herein.

As depicted, encoder 200 implements hybrid video coding, which combines a differential prediction stage and a transformation stage of a residual signal that is the difference between a source and a prediction. By way of example only, the differential prediction stage may implement Motion Compensated Prediction (MCP) and the transformation stage may implement a 2D Discrete Cosine Transform (DCT). Various other implementations of the differential prediction stage and the transformation stage are known to persons skilled in the art, and may be used to implement embodiments disclosed herein.

Encoder 200 receives content data in the form of signal X. Predictor 204 generates a predicted signal pX as a prediction of signal X. Predictor 204 may implement, for example, MCP. A residual signal $\varepsilon$ is computed at operator 220 as the difference between the original signal X and the predicted signal pX. Transformer 206 transforms the residual signal $\varepsilon$ to generate a transformed signal t. The transformation decorrelates and compacts the residual signal information to fewer samples or coefficients. In the depicted embodiment, transformer 206 implements DCT. In other embodiments, another suitable transformation may be used. Quantizer 208 performs quantization on the transformed signal t to generate a quantized signal Y. Quantizer 208 may, for example, perform integer division at a pre-defined quantization step size and then round the result. Entropy coder 212 encodes the quantized signal Y to generate encoded bitstream signal R suitable for streaming. Entropy coder 212 may, for example, implement a lossless compression coding.

Encoder 200 includes a reconstruction loop that includes inverse quantizer 216 that applies inverse quantization to the signal Y (representing the transformed and quantized residue) to generate a signal $\hat{t}$, which represents a reconstruction of the transformed signal t. The transformed signal t may include distortions caused by quantization and lossy inverse quantization (e.g., losses caused by rounding during quantization). Inverse quantizer 216 may, for example, perform integer multiplication at the pre-defined quantization step size. The reconstruction loop also includes inverse transformer 218 which applies an inverse transformation to transformed signal t to generate a signal $\hat{\varepsilon}$, which represents a reconstruction of the residual signal $\varepsilon$. Inverse transformer 218 applies an inverse of the operation(s) applied at transformer 206, such that if the operation(s) applied at transformer 206 can be expressed as T, then the operations applied at inverse transformer 218 can be expressed mathematically as $T^{-1}$. Signal $\hat{\varepsilon}$ and predicted signal pX are summed at operator 222 to generate a signal $\hat{X}$, which represents a reconstruction of the original signal X. The reconstruction loop also includes one or more loop filters 224 which apply one or more filter steps to signal $\hat{X}$ to generate a smoothened reconstructed signal $\hat{\hat{X}}$. The reconstructed signal $\hat{\hat{X}}$ is provided to predictor 204, for use in subsequent predictions. Predictor 204 provides to entropy coder 121 a signal 226 which represents various prediction parameters such as a prediction type and other information used to generate predicted signal pX, as may be included by entropy coder 212 in encoded bitstream signal R.

Figure 3:
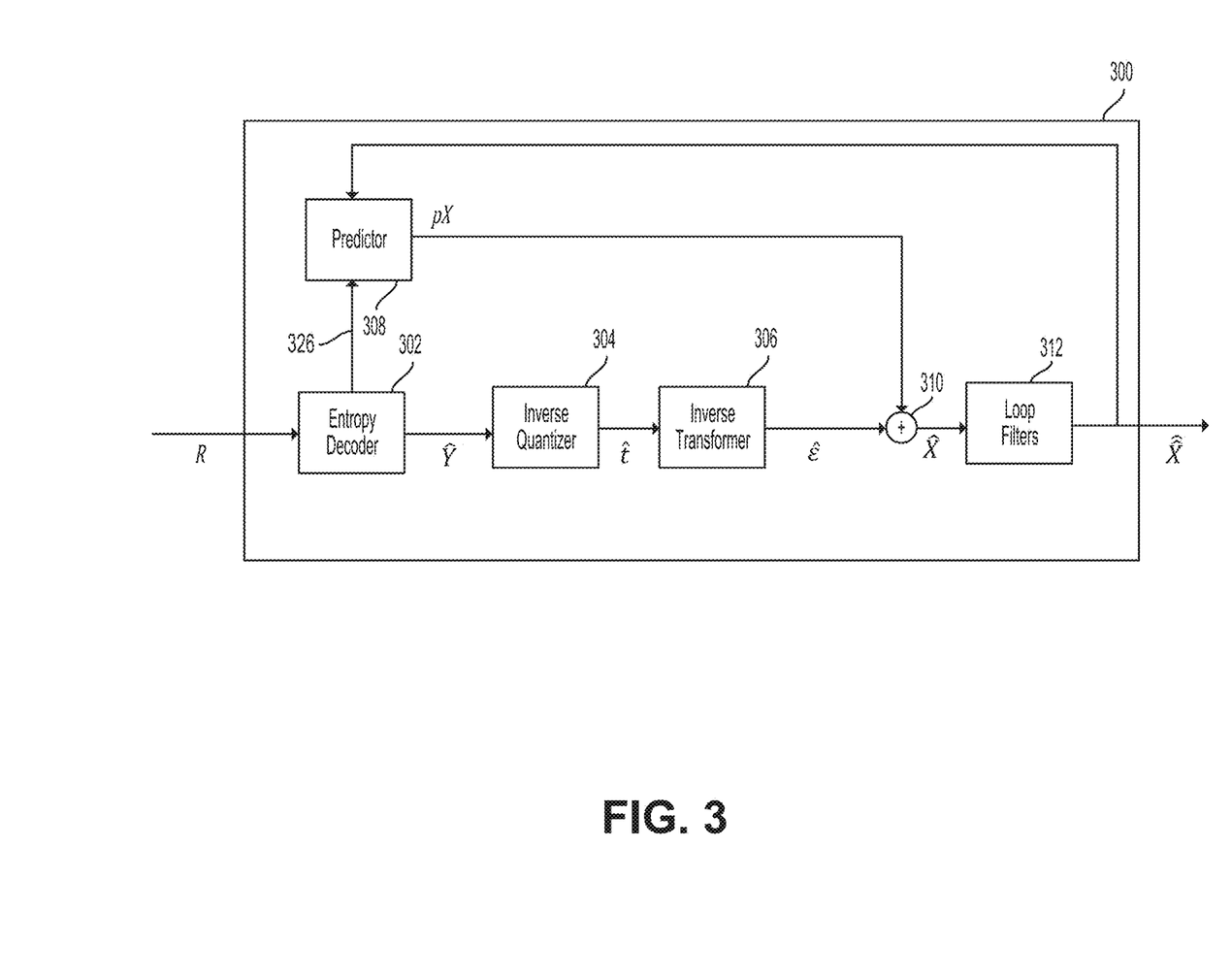
FIG. 3 is a schematic diagram of a hybrid decoder corresponding to the hybrid encoder of FIG. 2.

FIG. 3 depicts conventional decoder 300, corresponding to encoder 200. Decoder 300 may be implemented, for example, at a client device 150.

As depicted, decoder 300 receives encoded bitstream signal R. Entropy decoder 302 decodes signal R to produce decoded signal $\hat{Y}$, which represents a reconstruction of signal Y (the transformed and quantized residual signal). Entropy decoder 302 applies an inverse of the operation(s) applied at entropy coder 212, such that if the operation(s) applied at entropy coder 212 can be expressed as E, then the operations applied at entropy decoder 302 can be expressed mathematically as $E^{-1}$. Inverse quantizer 304 applies inverse quantization to the signal $\hat{Y}$ to generate a signal $\hat{t}$, which represents a reconstruction of the transformed signal t. Entropy decoder 302 provides to predictor 204 a signal 326 which represents various prediction parameters such as a prediction type and other information used at encoder 200 to generate predicted signal pX, as may be obtained by entropy decoder 302 from the encoded bitstream signal R. Inverse quantizer 304 may be substantially the same as inverse quantizer 216. Inverse transformer 306 applies an inverse transformation to signal $\hat{t}$ to generate a signal $\hat{\varepsilon}$, which represents a reconstruction of the residue signal ε. Inverse transformer 306 may be substantially the same as inverse transformer 218. Predictor 308 generates a predicted signal pX as a prediction of original signal X. Signal $\hat{ε}$ and predicted signal pX are summed at operator 310 to generate a signal $\hat{X}$, which represents a reconstruction of the original signal X. Loop filters 312 apply one or more filter steps to signal $\hat{X}$ to generate a smoothened reconstructed signal $\hat{\hat{X}}$. The reconstructed signal $\hat{\hat{X}}$ is outputted from decoder 300 for downstream processing (e.g., playback).

In some embodiments, various aspects of encoder 200 and decoder 300 (e.g., prediction, transformation, entropy coding/decoding, etc.) conform with video encoding standards such as, e.g. H.264/ AVC, H265/ HEVC, H.266/ VVC or VP8/9, AV1, or the like. In some embodiments, various aspects of encoder 200 and decoder 300 conform with processing model parameters or syntax of such standards.

Figure 4:
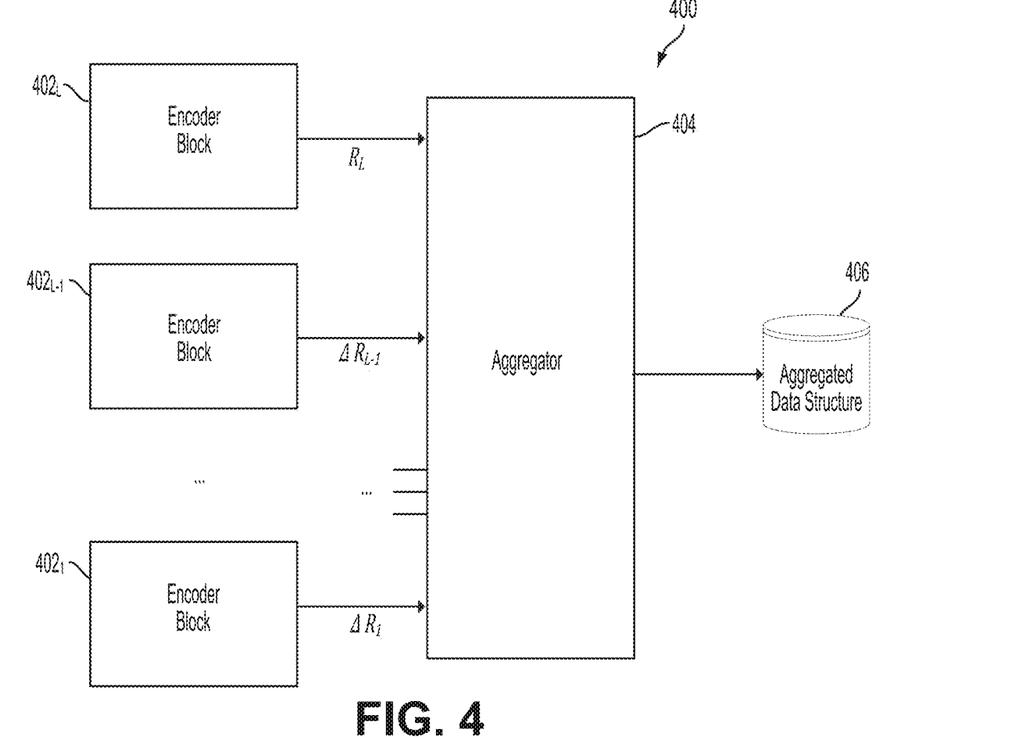
FIG. 4 is a block diagram of a scalable hybrid encoder of the content processing system of FIG. 1, in accordance with an embodiment.

FIG. 4 is a high-level block diagram of an encoder 400, in accordance with an embodiment. Encoder 400 is adapted from encoder 200 with differences and improvements described herein.

Like encoder 200, encoder 400 implements hybrid encoding and thus may be referred to as a hybrid encoder. Encoder 400 is scalable in that it is configured to encode video content at a plurality of quality levels, and thus is scalable across quality levels. In some embodiments, quality levels may be based on PSNR, SSIM, VMAF or any suitable criterion or combination of criteria, including subjective criterion/criteria. Each of the quality levels may be associated with a targeted bitrate for an encoded bitstream, where quality level is an increasing function of the bitrate. Each of the quality levels may result in a different expected distance between an original signal and an encoded/decoded signal due to data distortions in an encoding process. In some embodiments, a difference in quality level may result at least partially from a different quantization step size used in an encoding process, which may result in different amounts of rate-distortion.

As depicted, encoder 400 includes a plurality of encoder blocks $402_{L-1}$, $402_L$, ... $402_1$, where L is the total number of encoder blocks. Each of these encoder blocks may be referred to as an encoder block 402, and collectively, these encoder blocks may be referred to as encoder blocks 402.

Each encoder block 402 is dedicated to encoding data in adherence to a particular associated encoding profile, i.e., profile 1 ... profile L-1, profile L. Each profile defines a corresponding quality level. In some embodiments, the quality level may be defined with reference to a particular video encoding standard such as, e.g. H.264/ AVC, H265/ HEVC, H.266/ VVC or VP8/9, AV1, or the like. In some embodiments, the quality level may be defined numerically. Each encoder block 402 encodes bitstream data at a quality level defined in the corresponding encoding profile.

In some embodiments, profiles L, L-1, ... 1 are ordered by quality level. For example, when ordered by quality level, profile L defines the highest quality level and profile 1 defines the lowest quality level.

Encoder blocks $402_L$, $402_{L-1}$, ... $402_1$ generate encoded data signals of the source content, in accordance with a respective corresponding one of profiles L, L-1, ... 1. In particular, encoder block $402_L$ generates signal $R_L$, which is a bitstream signal suitable for streaming, wherein source content is encoded in accordance with corresponding profile L and the quality level defined therein. Encoder block $402_{L-1}$ generates signal $\Delta R_{L-1}$, which is a differential encoding of the source content, encoded in accordance with corresponding profile L-1. Encoder block $402_1$ generates signal $\Delta R_1$, which is a differential encoding of the source content, encoded in accordance with corresponding profile 1. For simplicity of illustration, various other encoder blocks 402 (e.g., $402_{L-2}$, $402_{L-3}$, and so on) are not shown. These other encoder blocks 402 each generates a signal that is a further encoding of the source content, encoded in accordance with a corresponding profile (e.g., profile L-2, profile L-3, and so on).

Each of the encoded signals generated by encoder blocks 402 are provided to aggregator 404. Aggregator 404 aggregates these encoded signals into aggregated data structure 406. Aggregated data structure 406 stores data reflecting a digital representation of the encoded signals. Aggregated data structure 406 has a structure organizing encoded data into a plurality of data layers, each associated with a corresponding one of the encoded signals (e.g., $R_L$, $\Delta R_{L-1}$, ... $\Delta R_1$).

In some embodiments, the plurality of data layers are ordered by quality level associated with the encoded signals. For example, L may define the highest quality level and profile 1 may define the lowest quality level. Thus, in such embodiments, $R_L$ is the highest quality encoded signal, each lower ordered signal is progressively of lower quality level.

Aggregated data structure 406 in structured to allows data of a particular data layer to be separately retrievable. In some embodiments, aggregated data structure 406 may include separate data fields corresponding to each of the data layers, allowing for retrieval of data in a particular layer on demand. In some embodiments, aggregated data structure 406 may be stored in an electronic datastore at content processing system 100.

Figure 5:
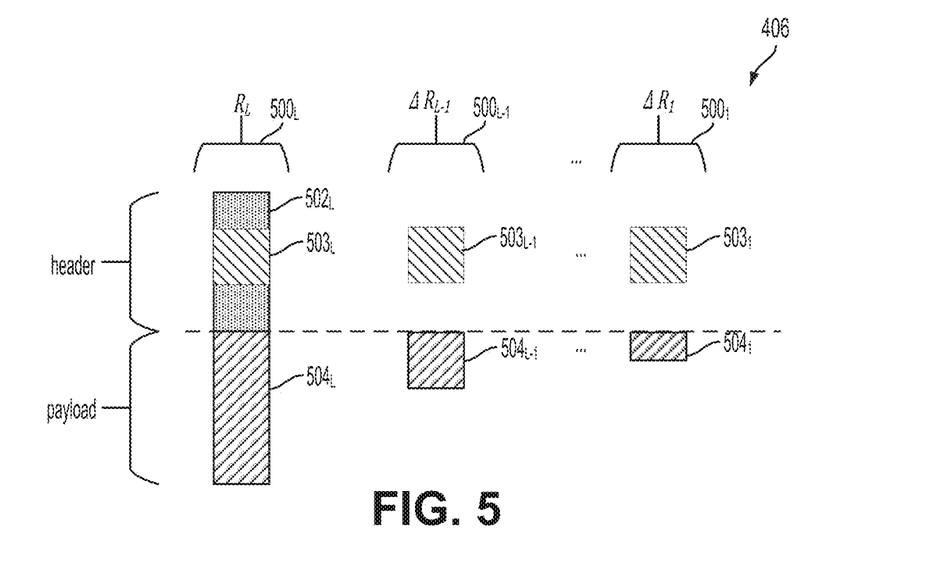
FIG. 5 is a schematic diagram of an aggregated data structure as provided by the scalable hybrid encoder of FIG. 4, in accordance with an embodiment.

FIG. 5 schematically depicts aggregated data structure 406, in accordance with an embodiment. The content and organization of data in aggregated data structure 406 for an example block of pixels is shown.

In some embodiments, a block of pixels may be a macroblock, a transform block, a prediction block, or another group of pixel for which one or more encoding decisions are shared. In some embodiments, a block may be an 8×8 group of pixel. In some embodiments, a block may be a group of pixels defined by the relevant video encoding standard. In some embodiments, a block may correspond to a Coding Unit (CU).

As depicted, aggregated data structure 406 includes data layers $500_L$, $500_{L-1}$, ... $500_1$, corresponding respectively to encoded signals $R_L$, $\Delta R_{L-1}$, ... $\Delta R_1$. Each of these data layers may be referred to as a data layer 500, and collectively, these data layers may be referred to as data layers 500.

Data layers 500 includes data defining encoded data signals for a given block of pixels, the signals encoded in accordance with a corresponding one of profiles L, L-1, ... 1. Data in each data layer 500 are organized into a header region and a payload region.

Data layer $500_L$ includes data defining encoded signal $R_L$. Data layer $500_L$ includes a header region $502_L$ and a payload region $504_L$. Header region $502_L$ includes data defining various block-level encoding decisions for the given block. The particular encoding decisions will vary from embodiment to embodiment, in dependence on the type of encoding used. The encoding decisions in header region $502_L$ includes data $503_L$ defining the quantization step size for the quality level defined in profile L. In some embodiments, the encoding decisions may include, for example, one or more of whether the block is INTRA encoded, or INTER encoded, decisions regarding a prediction direction, a transform size, particular motion vectors in the block, or the like. Payload region $504_L$ includes data defining transform coefficients generated by encoder block $402_L$. The transform coefficients may include, for example, DCT coefficients. The transform coefficients may include other types of transform coefficients.

Data layer $500_{L-1}$ includes data defining encoded signal $R_{L-1}$. Data layer $500_{L-1}$ includes a header region $502_{L-1}$ and a payload region $504_{L-1}$. Header region $502_{L-1}$ includes data $503_{L-1}$ defining the quantization step size for the quality level defined in profile L-1. Data $503_{L-1}$ may also include data defining decisions that depend on the particular quality level defined in profile L-1. Payload region $504_{L-1}$ includes data defining transform coefficients generated by encoder block $402_{L-1}$.

Similarly, data layer $500_1$ includes data defining encoded signal $R_1$. Data layer $500_1$ includes a header region $502_1$ and a payload region $504_1$. Header region $502_1$ includes data $503_1$ defining the quantization step size for the quality level defined in profile 1. Data $503_1$ may also include data defining decisions that depend on the particular quality level defined in profile 1. Payload region $504_1$ includes data defining transform coefficients generated by encoder block $402_1$.

For simplicity of illustration, various other data layers of aggregated data structure 406 (e.g., corresponding respectively to encoded signals for profiles L-2, L-3, and so on) are not shown.

Conveniently, as shown, each of header regions $502_{L-1}$ . . . $502_1$ omits at least some data defining decisions that are common across multiple profiles, e.g., decisions that apply to each multiple quality levels. In some embodiments, the only data stored in header regions other than $502_L$, i.e., $502_{L-1}$ . . . $502_1$ are data defining the quantization step size that may be unique to a particular profile. Accordingly, data storage requirements may be reduced.

In some embodiments, at least some of the data in header regions $502_L$, $502_{L-1}$, . . . $502_1$ may be stored differentially. For example, data $503_L$, $503_{L-1}$, . . . $503_1$ defining the quantization step size may be stored differentially. In some embodiments, at least some of the data in payload region $504_L$, $504_{L-1}$, . . . $504_1$ may be stored differentially. For example, the data defining transform coefficients may be stored differentially. In such embodiments, use of differential (or delta) coding may result in reductions in data storage requirements.

Figure 6:
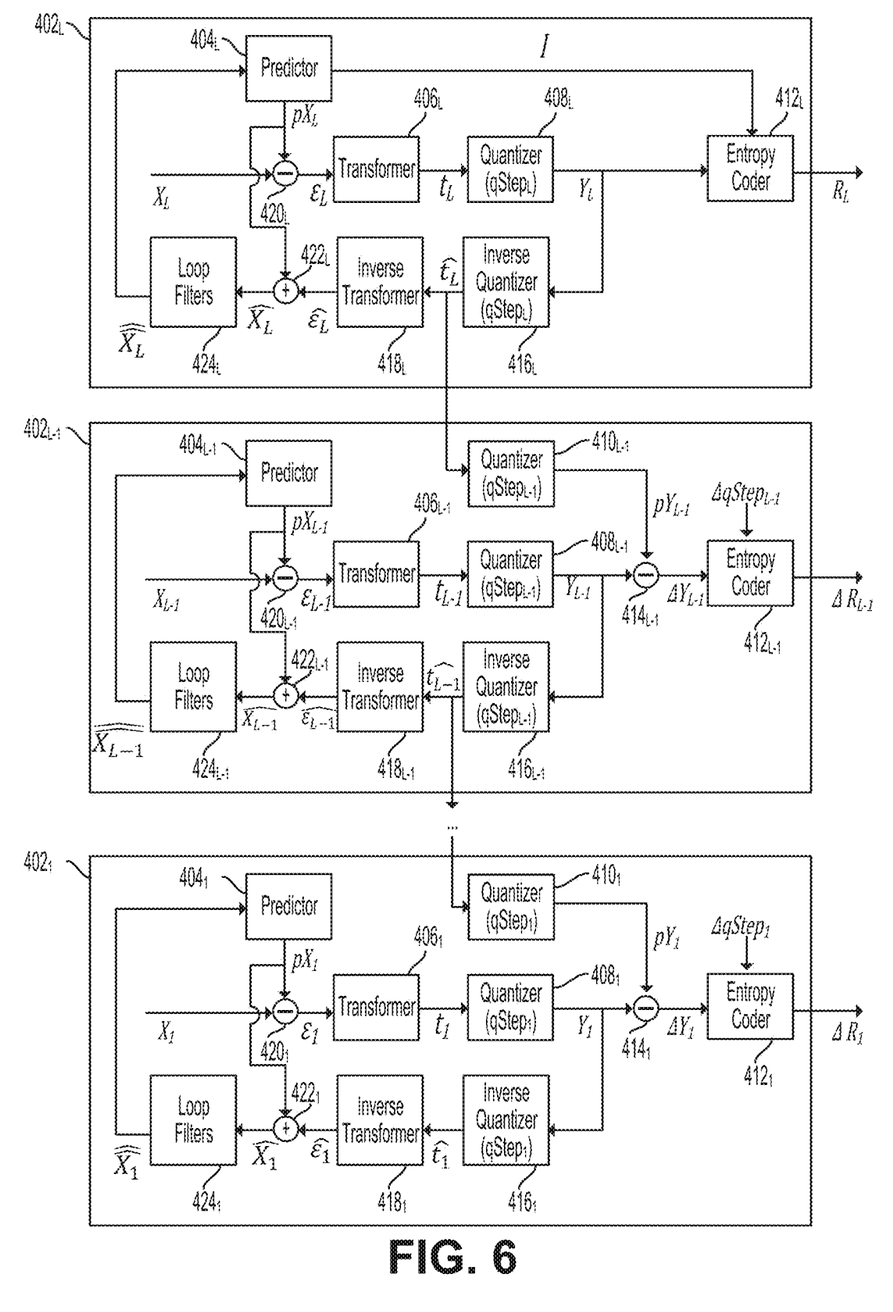
FIG. 6 is a schematic diagram of encoder blocks of the scalable hybrid encoder of FIG. 4, in accordance with an embodiment.

FIG. 6 is a schematic diagram showing further details of encoder blocks 402, in accordance with an embodiment.

In the depicted embodiment, each encoder block 402 is adapted from encoder 200, and some components may be substantially similar. For example, each of predictor $404_L$, $404_{L-1}$, . . . $404_1$ may be substantially similar to predictor 204; each of transformers $406_L$, $406_{L-1}$ . . . $406_1$ may be substantially similar to transformer 206; each of quantizer $408_L$, $408_{L-1}$, . . . $408_1$ may be substantially similar to quantizer 208, and so on. In each case, as between encoder 200 and an encoder block 402, similar numerals designated similar components.

As depicted, each encoder block 402 uses a corresponding quantization step size. For example, each of encoder blocks $402_L$, $402_{L-1}$, . . . $402_1$ uses a corresponding quantization step size $qStep_L$, $qStep_{L-1}$, . . . $\Delta qStep_1$ corresponding to a respective profile L-1, L, . . . 1.

Encoder block 402L receives signal $X_L$ representing content data, and applies processing in manners similar to encoder 200. In some embodiments, $X_L$, $X_{L-1}$ and $X_1$ may be, respectively, differently filtered versions of the same signal. In some embodiments, $X_L$, $X_{L-1}$ and $X_1$ may be, respectively, different resolution versions of the same signal. Entropy coder $412_L$ receives signal I from predictor $404_L$ and signal $Y_L$ from quantizer $408_L$. Signal I may include the signal contents described above for signal 226 (FIG. 2). Entropy coder $412_L$ uses signal I to apply entropy coding to signal $Y_L$ to generate encoded bitstream signal $R_L$.

Compared to encoder 200, each of encoder blocks $402_{L-1}$ . . . $402_1$ additionally includes a quantizer $410_{L-1}$ . . . $410_1$. Each quantizer $410_{L-1}$ . . . $410_1$ receives a transform domain signal $\hat{t}_L$ . . . $\hat{t}_2$ from the encoder block 402 of the preceding level, and rescales it for the encoder block 402 of the current level. So, quantizer $410_{L-1}$ of encoder block $402_{L-1}$ receives a signal $\hat{t}_L$ from inverse quantizer $416_L$ of encoder block $402_L$; quantizer $410_{L-2}$ (not shown) of encoder block $402_{L-2}$ (not shown) receives a signal $\widehat{t_{L-1}}$ from inverse quantizer $416_{L-1}$ of encoder block $402_{L-1}$, and so on. Finally, quantizer $410_1$ of encoder block $402_1$ receives a signal $\hat{t}_2$ from inverse quantizer $416_2$ (not shown) of encoder block $402_2$ (not shown). Each one of quantizers $410_{L-1}$ . . . $410_1$ applies quantization with the quantization step size of the associated level, e.g., quantizer $410_{L-1}$ uses quantization step size corresponding to profile L-1, and quantizer $410_1$ uses a quantization step size corresponding to profile 1.

Compared to encoder 200, each of encoder blocks $402_{L-1}$ . . . $402_1$ additionally includes a difference operator $414_{L-1}$ . . . $414_1$, for applying to the noted differential coding of transform coefficients. Each of operator $414_{L-1}$ . . . $414_1$ provides a difference between, on one hand, quantized signal $pY_{L-1}$ . . . $pY_1$, as outputted by quantizer $410_{L-1}$ . . . $410_1$, and on the other hand, the quantized signal $Y_{L-1}$ . . . $pY_L$ as outputted by quantizer $408_{L-1}$ . . . $408_1$. Notable, differential coding is performed in the transformed domain.

Each one of operators $414_{L-1}$ . . . $414_1$ provides a corresponding differential signal $\Delta Y_{L-1}$ . . . $\Delta Y_1$ to a corresponding one of entropy coders $412_{L-1}$ . . . $412_1$. Each one of entropy coders $412_{L-1}$ . . . $412_1$ also receives a corresponding signal $\Delta qStep_{L-1}$ . . . $\Delta qStep_1$, which represents the change in quantization step size from a higher-ordered encoder block 402 to a lower-ordered encoder block 402. Thus, for example, $\Delta qStep_{L-1}$ represents the change in quantization step size from encoder block $402_L$ to encoder block $402_{L-1}$, and $\Delta qStep_1$ represents the change in quantization step size from encoder block $402_2$ to encoder block $402_1$.

Each one of entropy coders $412_{L-1}$ . . . $412_1$ applies entropy coding to the corresponding differential signal $\Delta Y_{L-1}$ . . . $\Delta Y_1$, using the corresponding signal $\Delta qStep_{L-1}$ . . . $\Delta qStep_1$, to generate corresponding encoded differential signal $\Delta R_{L-1}$ . . . $\Delta R_1$. As noted above, signals $R_L$, $\Delta R_{L-1}$, . . . $\Delta R_1$ are provided to aggregator 404 (FIG. 4).

In some embodiments, one or more of loop filters $424_L$, $424_{L-1}$, . . . $424_1$ may be omitted, e.g., when smoothing provided by these loop filters is not desired.

Figure 7:
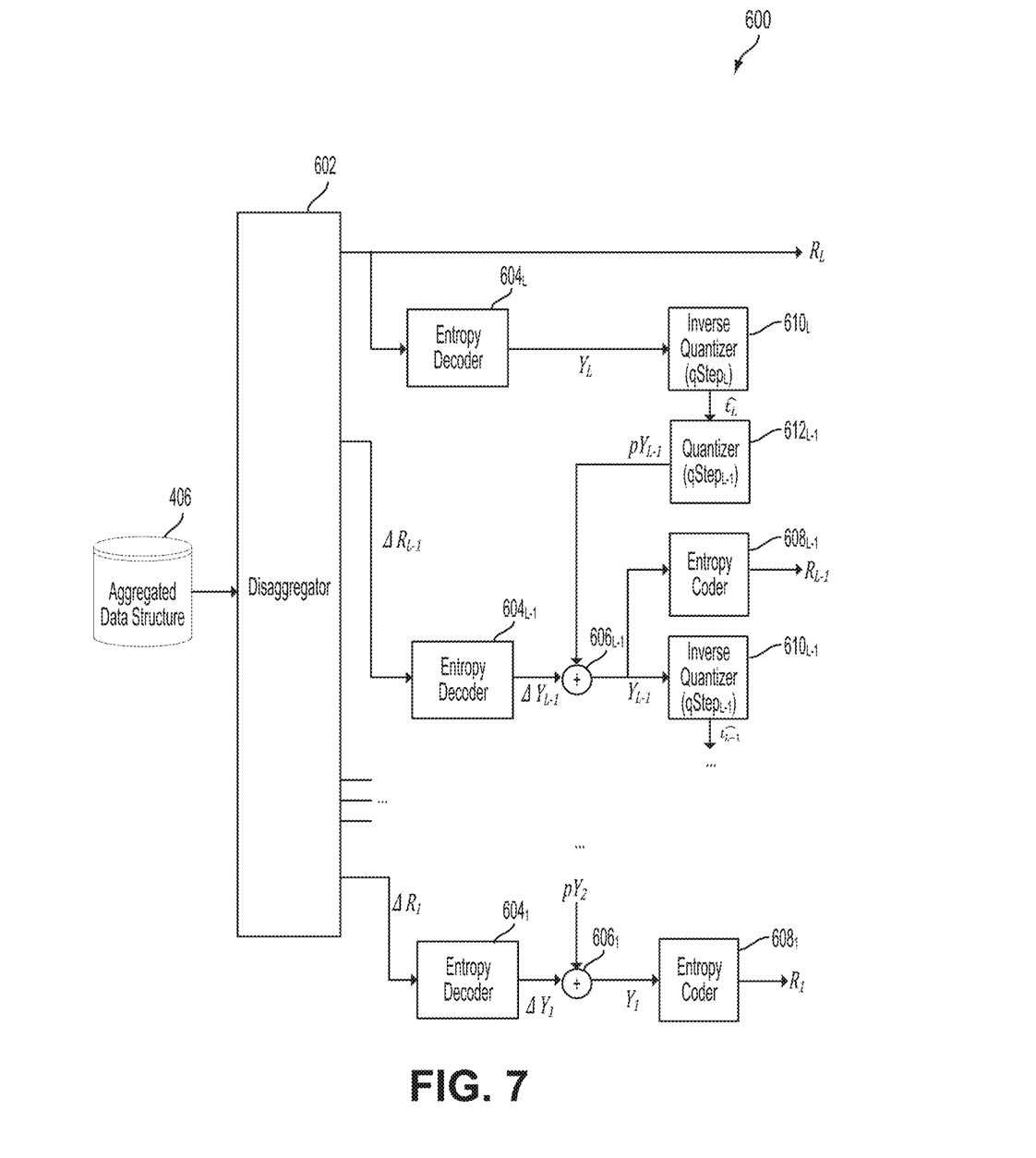
FIG. 7 is a schematic diagram of an on-demand streaming subsystem of the content processing system of FIG. 1, in accordance with an embodiment.

FIG. 7 depicts an on-demand streaming subsystem 600 of content processing system 100, in accordance with an embodiment. On-demand streaming subsystem 600 provides bitstreams (including reconstructed bitstreams) of previously stored video content, when requested by an end-user (e.g., on demand). On-demand streaming subsystem 600 provides one or more bitstreams encoded in accordance with one or more desired profiles L, L-1, . . . 1. A desired profile may, for example, reflect a desired bitrate based on an end user's available bandwidth for streaming.

On-demand streaming subsystem 600 includes a disaggregator 602. Disaggregator 602 retrieves data from aggregated data structure 406, e.g., from an electronic data store at content processing system 100. Disaggregator 602 retrieves one or more data layers 500 from data structure 406, where the particular retrieved data layer(s) depends on the particular profile requested.

When a bitstream for profile L is desired, disaggregator 602 retrieves data layer $500_L$. Data layer $500_L$ includes bitstream signal $R_L$, which can be streamed to an end user (e.g., at a client device 150) without prior encoding, decoding, quantization, or inverse quantization steps.

When a bitstream for profile L-1 is desired, disaggregator 602 retrieves data layer $500_{L-1}$ and additionally each higher-ordered data layer 500 (i.e., data layer $500_L$). When a bitstream for profile L-2 is desired, disaggregator 602 retrieves data layer $500_{L-2}$ and each higher-ordered data layer 500 (i.e., data layers $500_{L-1}$ and $500_L$), and so on. When a bitstream for profile 1 is desired, disaggregator 602 retrieves data layer $500_1$ and each higher-ordered data layer 500 (i.e., data layers $500_L$ through $500_2$). Because data layers stored as differentially coded data, the data in higher-ordered data layer(s) 500 are used to reconstruct a bitstream for a given profile.

When a bitstream for a given desired profile causes disaggregator 602 to retrieve multiple data layers 500, the retrieved multiple data layers must be further processed to generate the bitstream.

For example, when a bitstream for profile L-1 is desired, disaggregator 602 retrieves two data layers $500_L$ and $500_{L-1}$, which respectively include the encoded bitstream signal $R_L$ and the differentially encoded signal $\Delta R_{L-1}$. Signal $R_L$ is provided to entropy decoder $604_L$ which generates a signal $Y_L$. Signal $Y_L$ is provided to inverse quantizer 610, which applies inverse quantization with a quantization step size $qStep_L$ to generate a signal $\widehat{t_L}$. Signal $\widehat{t_L}$ is provided to quantizer $612_{L-1}$ which applies quantization with a quantization step size $qStep_{L-1}$ to generate a signal $pY_{L-1}$.

Differentially encoded signal $\Delta R_{L-1}$ (retrieved by disaggregator 602) is provided to entropy decoder $604_{L-1}$, which generates a signal $\Delta Y_{L-1}$. Signals $\Delta Y_{L-1}$ and $pY_{L-1}$ are summed at operator $606_{L-1}$ to provide a signal $Y_{L-1}$. Signal $Y_{L-1}$ is provided to entropy coder $608_{L-1}$, which generates encoded bitstream signal $R_{L-1}$. The encoded data for bitstream signal $R_{L-1}$ can be streamed to an end user (e.g., at a client device 150).

Processing to recover lower-ordered bitstream signals (e.g., $R_{L-2} \ldots R_1$) proceeds in a manner similar to that described above for $R_{L-1}$. With reference to bitstream signal $R_{L-2}$, signal $Y_{L-1}$ is also provided to inverse quantizer $610_{L-1}$ which applies inverse quantization with a quantization step size $qStep_{L-1}$ to generate a signal $\widehat{t_{L-1}}$. Signal $\widehat{t_{L-1}}$ is used to generate encoded bitstream signal $R_{L-2}$ in manners similar how signal $\widehat{t_L}$ is used to generate encoded bitstream signal $R_{L-1}$.

With reference to bitstream signal $R_1$, differentially encoded signal $\Delta R_1$ (retrieved by disaggregator 602) is provided to entropy decoder $604_1$, which generates a signal $\Delta Y_1$. Signal $pY_2$, is provided by quantizer $612_2$ (not shown) with a quantization step size $qStep_2$. Signals $\Delta Y_1$ and $pY_2$ are summed at operator $606_1$ to provide a signal $Y_1$. Signal $Y_1$ is provided to entropy coder $608_1$, which generates encoded bitstream signal $R_1$. The encoded data for bitstream signal $R_1$ can be streamed to an end user (e.g., at a client device 150).

For simplicity of illustration, various other components of on-demand streaming subsystem 600, e.g., for generating bitstream signal $R_{L-2} \ldots R_2$ are not shown.

Each of entropy decoders $604_L, 604_{L-1}, \ldots 604_1$ may be substantially similar to entropy decoder 302; each of entropy coders $608_L, 608_{L-1}, \ldots 608_1$ may be substantially similar to entropy coder 212; each of inverse quantizers $610_L, 610_{L-1} \ldots 610_1$ may be substantially similar to inverse quantizer 216; each of quantizer $612_L, 612_{L-1}, \ldots 612_1$ may be substantially similar to quantizer 208.

In some embodiments, on-demand streaming subsystem 600 is configured to provide simulcast capability, such that a plurality of bitstreams corresponding to multiple ones of profiles L, L-1, . . . 1 are concurrently provided for transmission.

In some embodiments, on-demand streaming subsystem 600 may be disposed at a network edge. For example, on-demand streaming subsystem 600 may be disposed within a neighbourhood hub, or within a business or a home. For example, on-demand streaming subsystem 600 may be implemented within a gateway device or a hub, or the like.

In such embodiments, content processing system 100 causes aggregated data structure 406 to be transmitted to on-demand streaming subsystem 600 at the network edge, e.g., via network 50 (FIG. 1). As discussed, in some embodiments, aggregated data structure 406 is smaller in size compared to separate bitstreams corresponding to each of profiles L, L-1, . . . 1. In such embodiments, transmitting aggregated data structure 406 instead of the separate bitstreams requires less data to be transmitted to the network edge.

From the edge, on-demand streaming subsystem 600 may transmit one or more requested bitstreams (e.g., $R_L, R_{L-1}, \ldots R_1$) to client devices 150, on demand. Transmission of such bitstreams at the edge may utilize a local WiFi network when available.

Figure 8:
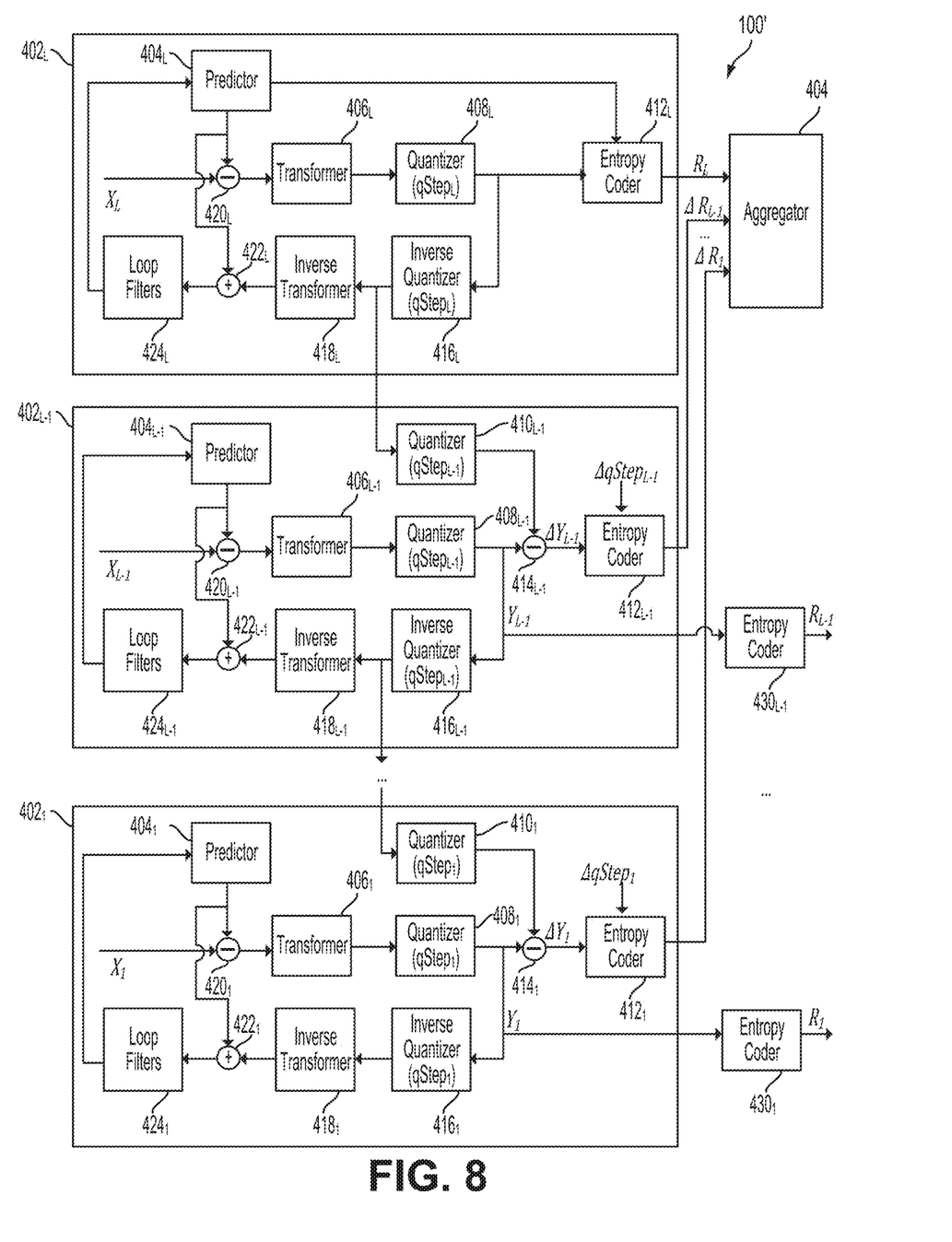
FIG. 8 is a schematic diagram of a content processing system, in accordance with another embodiment.

FIG. 8 is a schematic diagram of content processing system 100', in accordance with an embodiment. Content processing system 100' differs from content processing system 100 in that it provides encoded data to be stored for later on demand stream and also provides encoded data for live streaming.

Content processing system 100' provides encoded signals (e.g., $R_L, \Delta R_{L-1}, \ldots \Delta R_1$) in manners substantially as described for content processing system 100. Content processing system 100' additionally includes entropy coders $430_{L-1} \ldots 430_1$. Entropy coder $430_{L-1}$ receives signal $Y_{L-1}$ from quantizer $408_{L-1}$. Entropy coder $430_{L-1}$ applies entropy coding to signal $Y_{L-1}$ to generate encoded signal $R_{L-1}$, which may be streamed to an end user. Similarly, entropy coder $430_1$ receives signal $Y_1$ from quantizer $408_1$. Entropy coder $430_1$ applies entropy coding to signal $Y_1$ to generate signal $R_1$, which may be streamed to an end user. Each of entropy coders $430_{L-1} \ldots 430_1$ may be substantially similar to entropy coder 212.

Conveniently, generation of encoded signal $R_{L-1} \ldots R_1$ bypasses aggregator 404 (and on-demand streaming subsystem 600), and may be used to provide a livestream of the encoded signals.

As noted, some embodiments enable streaming video content at a plurality of quality levels in a manner that is compatible with conventional decoding equipment, such that no changes are required to an end user's device (e.g., device 150). For example, in such embodiments, data is encoded and transmitted (e.g., by content processing system 100 or content processing system 100') in a manner that can be decoded by decoder 300.

The operation of content processing system 100 is further described with reference to the flowchart depicted in FIG. 9. Content processing system 100 performs the example operations depicted at blocks 900 and onward, in accordance with an embodiment.

At block 902, content processing system 100 receives source content data to be encoded, e.g., from a content source 10. Source content data may, for example, include data defining a signal $X_L$. Content processing system 100 may also receive one or more indicators of the quality levels at which the content data is to be encoded. In some embodiments, these indicators may indicate a particular profile L, L-1, . . . 1 each defining a particular quality level. In some embodiments, the particular profiles L, L-1, . . . 1 and/or quality levels are pre-defined at content processing system 100, and there is no need to receive indicators of profiles and/or quality levels.

At block 904, content processing system 100 encodes the video data to generate an encoded data structure such as, for example, aggregated data structure 406. The encoded data structure includes, for a given pixel block of the video data: a plurality of data layers (e.g., data layers 500). Each of the data layers is associated with one of the quality levels. Each of the data layers including data defining: a plurality of transform coefficients encoded for the associated quality level (e.g., in payload region $504_L$, $504_{L-1}$, . . . $504_1$); and a quantization step size for the given pixel block and the associated quality level (e.g., as part of data $503_L$, $503_{L-1}$, . . . $503_1$). Further, at least one of the data layers includes a header (e.g., header region $502_L$) including data defining a plurality of encoder decisions made for the given pixel block, the encoder decisions common across the quality levels.

At block 906, content processing system 100 receives a request for a bitstream for a given one of the plurality of quality levels, e.g., an on-demand request. The request may be serviced by, for example, on-demand streaming subsystem 600.

At block 908, on-demand streaming subsystem 600 retrieves from the encoded data structure at least one of the plurality of data layers storing data for the requested bitstream. For example, when a bitstream for profile L is desired, disaggregator 602 retrieves data layer $500_L$. In some cases, on-demand streaming subsystem 600 retrieves from the encoded data structure at least two of the plurality of data layers. For example, when a bitstream for profile L-1 is desired, disaggregator 602 retrieves data layer $500_{L-1}$ and additionally each high-ordered data layer 500 (i.e., data layer $500_L$).

At block 910, on-demand streaming subsystem 600 generates the requested bitstream upon processing the retrieved data layers. The requested bitstream may be generated in manners described herein (e.g., with reference to FIG. 7), and may include, for example, one or more of entropy decoding, inverse quantization, quantization, and entropy coding.

The requested bitstream may be transmitted to a client device 150. At client device 150, the bitstream may be decoded (e.g., using a decoder 300 or equivalent) for playback.

In some embodiments, content processing system 100 may transmit the encoded data structure to a network edge device (e.g., a gateway device or a hub, or the like.

Figure 9:
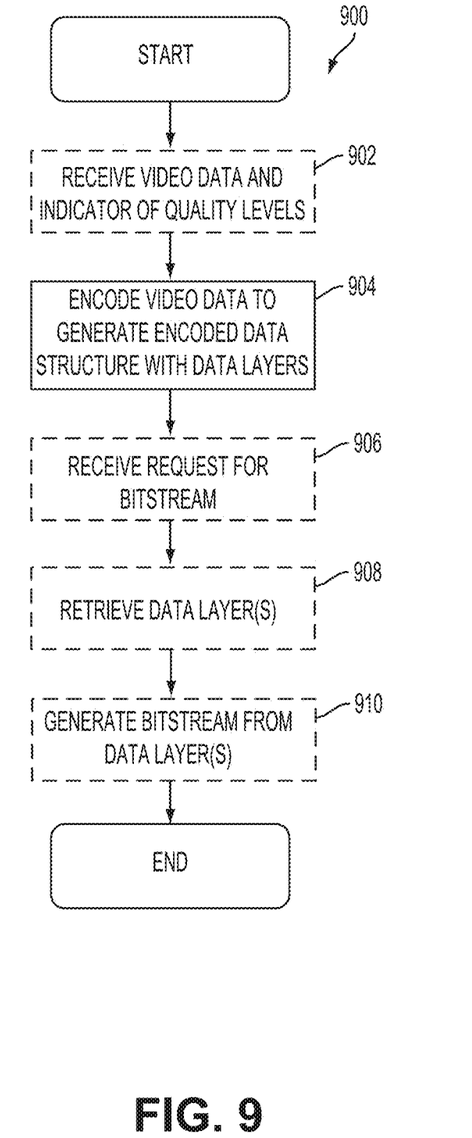
FIG. 9 is a flowchart of example operations performed at the content processing system of FIG. 1, in accordance with an embodiment.

It should be understood that steps of one or more of the blocks depicted in FIG. 9 may be performed in a different sequence or in an interleaved or iterative manner. Further, variations of the steps, omission or substitution of various steps, or additional steps may be considered. One or more blocks depicted with dotted lines may be omitted, in various embodiments.

At least some steps of one or more of the blocks depicted in FIG. 9 may also be performed at content processing system 100'.

Figure 10:
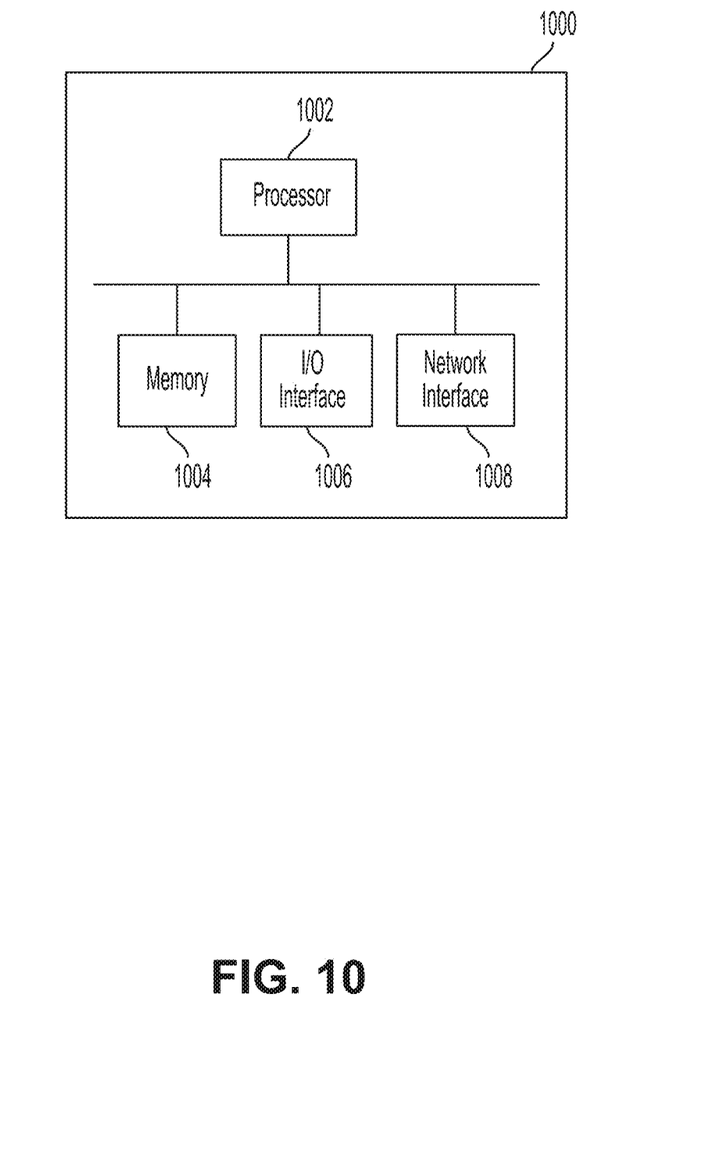
FIG. 10 is a schematic diagram for a computing device, in accordance with an embodiment.

FIG. 10 is a schematic diagram of computing device 1000 which may be used to implement content processing system 100 or content processing system 100', in accordance with an embodiment.

As depicted, computing device 1000 includes at least one processor 1002, memory 1004, at least one I/O interface 1006, and at least one network interface 1008.

Each processor 1002 may be, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof.

Memory 1004 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 1004 may provide one or more electronic datastores of content processing system 100, e.g., for storing aggregated data structure 406.

Each I/O interface 1006 enables computing device 1000 to interconnect with one or more input devices, such as a keyboard, mouse, camera, touch screen and a microphone, or with one or more output devices such as a display screen and a speaker.

Each network interface 1008 enables computing device 1000 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

For simplicity only, one computing device 1000 is shown but system 100 and/or system 100' may include multiple computing devices 1000. The computing devices 1000 may be the same or different types of devices. The computing devices 1000 may be connected in various ways including directly coupled, indirectly coupled via a network, and distributed over a wide geographic area and connected via a network (which may be referred to as "cloud computing").

For example, a computing device 1000 may be a server, network appliance, set-top box, embedded device, computer expansion module, personal computer, laptop, personal data assistant, cellular telephone, smartphone device, UMPC tablets, video display terminal, gaming console, or any other computing device capable of being configured to carry out the methods described herein.

In some embodiments, a computing device 1000 may function as a client device 150. In some embodiments, a computing device 1000 may implement decoder 300.

The foregoing discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which may be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Of course, the above described embodiments are intended to be illustrative only and in no way limiting. The described embodiments are susceptible to many modifications of form, arrangement of parts, details and order of operation. The disclosure is intended to encompass all such modification within its scope, as defined by the claims.

What is claimed is:

1. An encoding system comprising:
    a plurality of encoders for encoding a given block of video data at a plurality of quality levels, the plurality being greater than two, each of the encoders generating a bitstream associated with a corresponding one of the quality levels, the bitstream including:
        a plurality of transform coefficients encoded for an associated quality level; and
        a quantization step size for the given block of video data and the associated quality level;
        wherein at least one of the bitstreams includes a header including data defining a plurality of encoding decisions made for the given block of video data, the encoding decisions common across the quality levels; and
    an aggregator for aggregating the bitstreams generated by the plurality of encoders into an aggregated data structure, the aggregated data structure storing the bitstreams in a plurality of data layers ordered by the quality levels associated with the bitstreams, each data layer corresponding to a bitstream of the bitstreams, wherein the aggregated data structure includes separate data fields corresponding to each data layer to allow data of a particular data layer of the plurality of data layers to be separately retrievable.

2. The encoding system of claim 1, wherein the plurality of encoding decisions include one or more of whether the block is INTRA encoded or INTER encoded, decisions regarding a prediction direction, a transform size, and particular motion vectors in the block.

3. The encoding system of claim 1, wherein the plurality of transform coefficients are stored in the aggregated data structure differentially.

4. The encoding system of claim 1, wherein the plurality of transform coefficients include a discrete cosine transform coefficient.

5. The encoding system of claim 1, further comprising an electronic datastore for storing the aggregated data structure.

6. A computer-implemented method of encoding video data, the method comprising:
    encoding video data to generate an encoded data structure that includes, for a given pixel block:
        a plurality of data layers, each data layer associated with one of a plurality of quality levels, the plurality being greater than two, and each data layer including data defining:
            a bitstream encoding the given pixel block at the associated quality level;
            a plurality of transform coefficients encoded for the associated quality level; and
            a quantization step size for the given pixel block and the associated quality level;
    wherein at least one of the data layers includes a header including data defining a plurality of encoder decisions made for the given pixel block, the encoder decisions common across the quality levels
    wherein the plurality of data layers are ordered by the plurality of quality levels; and
    wherein the encoded data structure includes separate data fields corresponding to each data layer to allow data of a particular data layer of the plurality of data layers to be separately retrievable.

7. The computer-implemented method of claim 6, further comprising:
    receiving a request for the bitstream for a given one of the plurality of quality levels.

8. The computer-implemented method of claim 7, further comprising:
    retrieving from the encoded data structure at least one of the plurality of data layers storing data for the requested bitstream.

9. The computer-implemented method of claim 7, further comprising:
retrieving from the encoded data structure at least two of the plurality of data layers storing data for the requested bitstream.

10. The computer-implemented method of claim 9, generating the requested bitstream upon processing the retrieved data layers.

11. The computer-implemented method of claim 10, wherein the generating includes one or more of entropy decoding, inverse quantization, quantization, and entropy coding.

12. The computer-implemented method of claim 6, further comprising processing the encoded data structure to provide a simulcast at the plurality of quality levels.

13. The computer-implemented method of claim 6, further comprising transmitting the encoded data structure to a network edge device.

14. The computer-implemented method of claim 6, further comprising receiving at least one of the video data and indicator of the quality levels.

15. The computer-implemented method of claim 6, further comprising storing the encoded data structure in an electronic datastore.

* * * * *